United States Patent [19]

Löser et al.

[11] Patent Number: 4,708,499
[45] Date of Patent: Nov. 24, 1987

[54] PIVOT BEARING FOR STEERING COLUMNS OF MOTOR VEHICLES

[75] Inventors: Norbert Löser; Leopold Tilgner, both of Püttlingen; Jürgen Scholer, Siersburg, all of Fed. Rep. of Germany

[73] Assignee: SKF Gleitlager GmbH, Schweinfurt, Fed. Rep. of Germany

[21] Appl. No.: 895,048

[22] Filed: Aug. 11, 1986

[30] Foreign Application Priority Data

Aug. 16, 1985 [DE] Fed. Rep. of Germany ........ 3529316

[51] Int. Cl.$^4$ .................. F16C 43/04; F16C 33/76; F16C 27/06; F16C 23/08
[52] U.S. Cl. .................................. 384/539; 384/484; 384/498; 384/536
[58] Field of Search .................. 384/192, 206–209, 384/220, 457, 495–498, 536–539, 558, 582, 584, 585, 477, 484–486, 530, 526; 74/492, 493

[56] References Cited

U.S. PATENT DOCUMENTS 4,185,880  1/1980  Shiomi et al. .................. 384/498

FOREIGN PATENT DOCUMENTS 461384  11/1949  Canada .................................. 384/536
467474  10/1928  Fed. Rep. of Germany ...... 384/495
554981   7/1943  United Kingdom ................ 384/498

Primary Examiner—Stuart S. Levy
Assistant Examiner—Thomas R. Hannon
Attorney, Agent, or Firm—Eugene E. Renz, Jr.

[57] ABSTRACT

A pivot mounting assembly for movably mounting a steering column of a vehicle in a housing or the like comprising a rolling bearing including an outer ring and a plurality of rolling elements disposed between the steering column and a housing for pivotally mounting the outer ring in the housing including an intermediate mounting member disposed between the outer ring and housing and adopted for positive form locking connection with the housing in an axial direction and including a pair of cooperating retaining ring members having cooperable axially oriented projectors and recesses which are interengageable in a friction locking manner.

10 Claims, 2 Drawing Figures

A-A

4,708,499

PIVOT BEARING FOR STEERING COLUMNS OF MOTOR VEHICLES

FIELD OF THE INVENTION

The present invention relates to pivot bearings and particularly adapted for use in steering columns of motor vehicles.

BACKGROUND OF THE INVENTION

Pivot bearings of the type to which the present invention relate typically comprise a rolling bearing wherein a ring circumscribes the outer ring which has a spherical lateral surface and is disposed pivotally in an intermediate member comprised of two retaining rings. The intermediate member is connected in a positive form locking manner to a housing or the like. A bearing of this type is shown in West German Pat. No. 467,474. As illustrated in this patent, the retaining rings are held together by screw members which complicates assembly of the individual parts. Furthermore, it has been observed that the play between the pivoting parts varies over a period of time and is not automatically adjusted which results in premature unusability of the bearing.

SUMMARY OF THE INVENTION

With the foregoing in mind, it is an object of the present invention to provide a pivot bearing particularly adapted for use in steering columns of motor vehicles which is easy to install, easy to assemble and disassemble and wherein the play between the moving or pivoting parts is automatically adjusted to compensate for wear. To this end, at least one of the retaining rings for the pivotable part of the bearing is provided with axially directed projections on its end surface which engage in corresponding recesses in the other retaining ring in a form-locking or friction-locking manner. In this way, the parts of the bearing can be assembled easily without a need for special tools and the steering column can be adjusted without difficulty.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENT

Figure 1:
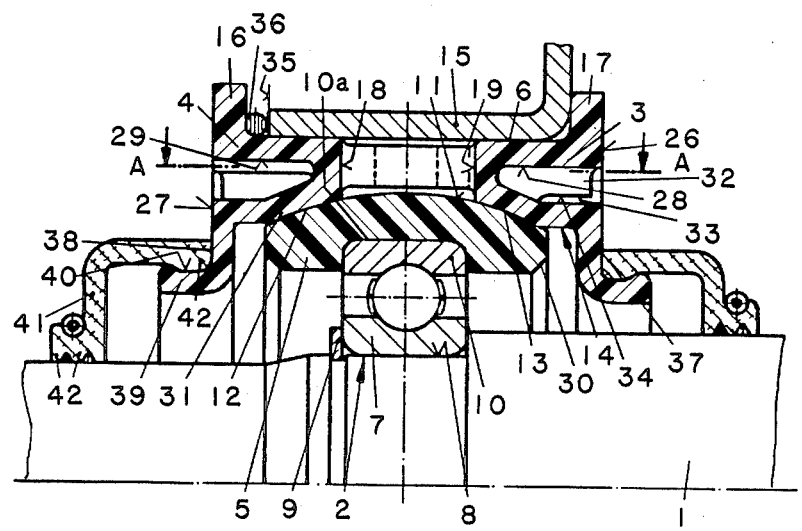
FIG. 1 is a sectional view through a bearing for a steering column constructed in accordance with the present invention.

Referring now to the drawing and particularly to FIG. 1 thereof, the present invention is illustrated in the environment of a steering column for a motor vehicle. The steering column, which is generally referenced by the numeral 1, is supported in a grooved ball bearing 2 which is pivotally supported in a housing bore 6 of a housing 15. Inner ring 7 of groove ball bearing 2 abuts a shoulder 8 of steering column 1 and is held in place axially by a split ring 9. A plastic ring 5 is spray molded to the outer peripheral surface 10a of the outer ring 10 of the bearing which, as illustrated, projects beyond the outer ring at opposite axial ends to define a wide spherical contact surface 11. The annular plastic ring 5 is mounted in complementary spherical bore surfaces 12, 13 of intermediate mounting assembly 14 which, in turn, engages in the cylindrical bore 6 of housing 15. Note that the intermediate mounting assembly 14 is supported in an axial direction by flanges 16, 17.

Figure 2:
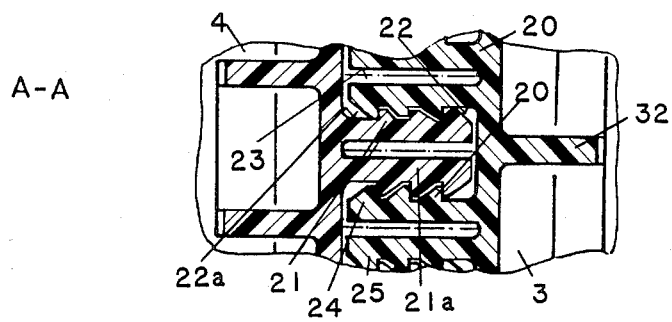
FIG. 2 is an enlarged fragmentary sectional view taken on lines A—A of FIG. 1 showing the coupling arrangement for the retaining rings.

Considering now the specific details and arrangement of the intermediate support assembly 14, the assembly, as illustrated, comprises a pair of complementary retaining rings 3, 4 preferably made of plastic which have confronting end surfaces 18, 19 having a series of circumferentially spaced axially extending projections 20, 21. The projections 20, 21, as illustrated, have a sawtooth-like profile 21a on one or both sides. Adjacent projections of the rings define pockets or recesses into which the projections of the other ring engage by a snap fit arrangement. For example, the projections 20 of ring 3 form in each case a recess 22 into which projection 21 of the other retaining ring 4 snaps to provide a form locking and/or friction locking connection therebetween. As illustrated in FIG. 2, each projection has an axially extending slot 23 dividing each projection into finger-like sections 24, 25 which compress elastically during assembly whereby the projections 20, 21 can snap more easily into the recesses 22, 22a. Further, the retaining rings 3, 4 are provided with recesses 28, 29 extending from the outer end surfaces 26, 27 facing away from each other so that the sections 30, 31 of the rings 3, 4 thus formed are provided with a degree of resiliency. This resiliency may be adjusted by means of several cross pieces 32 distributed circumferentially about the rings. Further, retaining rings 3, 4 are positioned against each other in such a way that the surfaces of the spherical bore segments 12, 13 rest elastically under pretension against spherical contact surface 11 of the plastic ring 5. In this manner, a pivoting bearing which is free of play and which adjusts itself automatically is obtained. Cross pieces 32 are provided with slots 33 bounded by surfaces 34 which tend to come together when an axial load is exerted on the bearing 2 to provide a positive inner lock and facilitate transmission of high forces. Elastic ring 36 is mounted between flange 16 of retaining ring 4 and the end surface 35 of housing 15 which tensions the parts of the assembly axially against each other and holds them in a predetermined position.

The retaining rings are designed to accommodate the sealing elements to provide an enclosed chamber to retain lubricant for the bearing. Specifically, the retaining rings 3, 4 have radially inwardly directed flanges 37, 38 respectively each of the flanges is turned axially outwardly as at 39, 39a and has at its terminal edge a circumferentially extending bead defining a ring-shaped groove 40, 40a. The sealing cap 41 has a complementary bead 42 which snap fits into the groove 40 and has a series of flexible axially spaced sealing lips 42 which engage steering column 1 and seal the bearing chamber C which may be filled with the lubricant in the conventional manner.

While a particular embodiment of the invention has been illustrated and described herein, it is not intended to limit the invention and changes and modifications may be made therein within the scope of the following claims. For example, projections 20, 21 can be provided with other profiles to achieve the same snap-fit action described, for example a trapezoidal profile. Further, the radius of curvature for the spherical contact surface 11 of plastic ring 5 can be larger than that of spherical bores 12, 13 so that the spherical bore surface segments 12, 13 conform to spherical lateral surface 11 of the plastic ring 5 when the bearing is assembled.

SUMMARY

A pivotable bearing, especially for the steering columns of motor vehicles, consists of a rolling bearing 2 with a ring 5 on the outer ring 10 of the rolling bearing 2; this ring 5 has a spherical lateral surface 11 and is installed pivotably in an intermediate piece 14 assembled from two retaining rings 3, 4. This intermediate piece is inserted into a housing bore 6 and is connected in a positive form-locking manner in the axial direction with the housing 15.

So that the bearing can be easily installed and so the play between the pivoting parts is adjusted automatically to compensate for wear, at least one retaining ring 3 is provided on the end surface with axially oriented projections 20, which engage in a form-locking and/or friction-locking manner with corresponding recesses 22a in the other retaining ring 4.

What is claimed is:

1. Pivot mounting assembly for movably mounting a steering column of a vehicle in a housing, comprising a rolling bearing including an outer ring and a plurality of rolling elements disposed between the steering column and housing, means for pivotally mounting the outer ring in the housing including resilient intermediate mounting member disposed between the outer ring and housing and adapted for positive form locking connection with the housing in an axial direction said mounting member comprising a pair of cooperating retaining ring members having cooperable axially oriented projectors and recesses which are interengageable in a friction locking manner, said retaining ring members including a seat for the bearing configured to allow a degree of pivotal movement and means for mounting the ring members elastically under pretension against the bearing.

2. Pivot mounting assembly for movably mounting a steering column of a vehicle in a housing, comprising a rolling bearing including an outer ring and a plurality of rolling elements disposed between the steering column and housing, means for pivotally mounting the outer ring in the housing including resilient intermediate mounting member disposed between the outer ring and housing and adapted for positive form locking connection with the housing in an axial direction, said mounting member comprising a pair of cooperating retaining ring members having cooperable axially oriented projectors and recesses which are interengageable in a friction locking manner, said retaining ring members including a seat for the bearing configured to allow a degree of pivotal movement and means for mounting the ring members elastically under pretension against the bearing, said retaining rings (3, 4) having outer axial end surfaces and including means defining recesses (28, 29) and elastic sections (30, 31) in said axial end surfaces.

3. Pivot mounting assembly according to claim 2, including recesses (22) between two adjacent projections (20) of one retaining ring, recesses (22) operable to hold projections (21) from the other retaining ring (4).

4. Pivot mounting assembly according to claim 3, wherein the projections (20, 21) have a sawtooth-like profile (21a) on one or both sides.

5. Pivot mounting assembly according to claim 3, wherein the projections (20, 21) have a trapezoidal profile on one or both sides.

6. Pivot mounting assembly according to claim 3, wherein each projection (20, 21) is provided with a slot (23).

7. Pivot mounting assembly according to claim 2, wherein several crosspieces (32) are provided in the recesses (28, 29), distributed around the circumference.

8. Pivot mounting assembly according to claim 7, wherein the crosspieces (32), starting from the end surfaces (26, 27), are provided with slots (33).

9. Pivot mounting assembly according to claim 2, including an elastic ring (36) between the flange (16) on one retaining ring (4) and the end surfae (35) of the housing (15).

10. Pivot mounting assembly for movably mounting a steering column of a vehicle in a housing, comprising a rolling bearing including an outer ring and a plurality of rolling elements disposed between the steering column and housing, means for pivotally mounting the outer ring in the housing including resilient intermediate mounting member disposed between the outer ring and housing and adapted for positive form locking connection with the housing in an axial direction said mounting member comprising a pair of cooperating retaining ring members having cooperable axially oriented projectors and recesses which are interengageable in a friction locking manner, said retaining ring members including a seat for the bearing configured to allow a degree of pivotal movement and means for mounting the ring members elastically under pretension against the bearing, said retaining rings (3, 4) having axial end surfaces (26, 27) facing in opposite directions with radially inwardly directed flanges (37, 38), the edge (39) of said flanges being bent axially outwardly and having a ring-shaped groove (40) to hold the bead (42) of a sealing cap (41).

* * * * *